E. HOPKINSON.
PROCESS FOR THE PRODUCTION OF FABRICATIONS OF RUBBER AND FILAMENTARY MATERIAL AND PRODUCTS OBTAINED THEREFROM.
APPLICATION FILED APR. 22, 1922.
1,424,020.
Patented July 25, 1922.
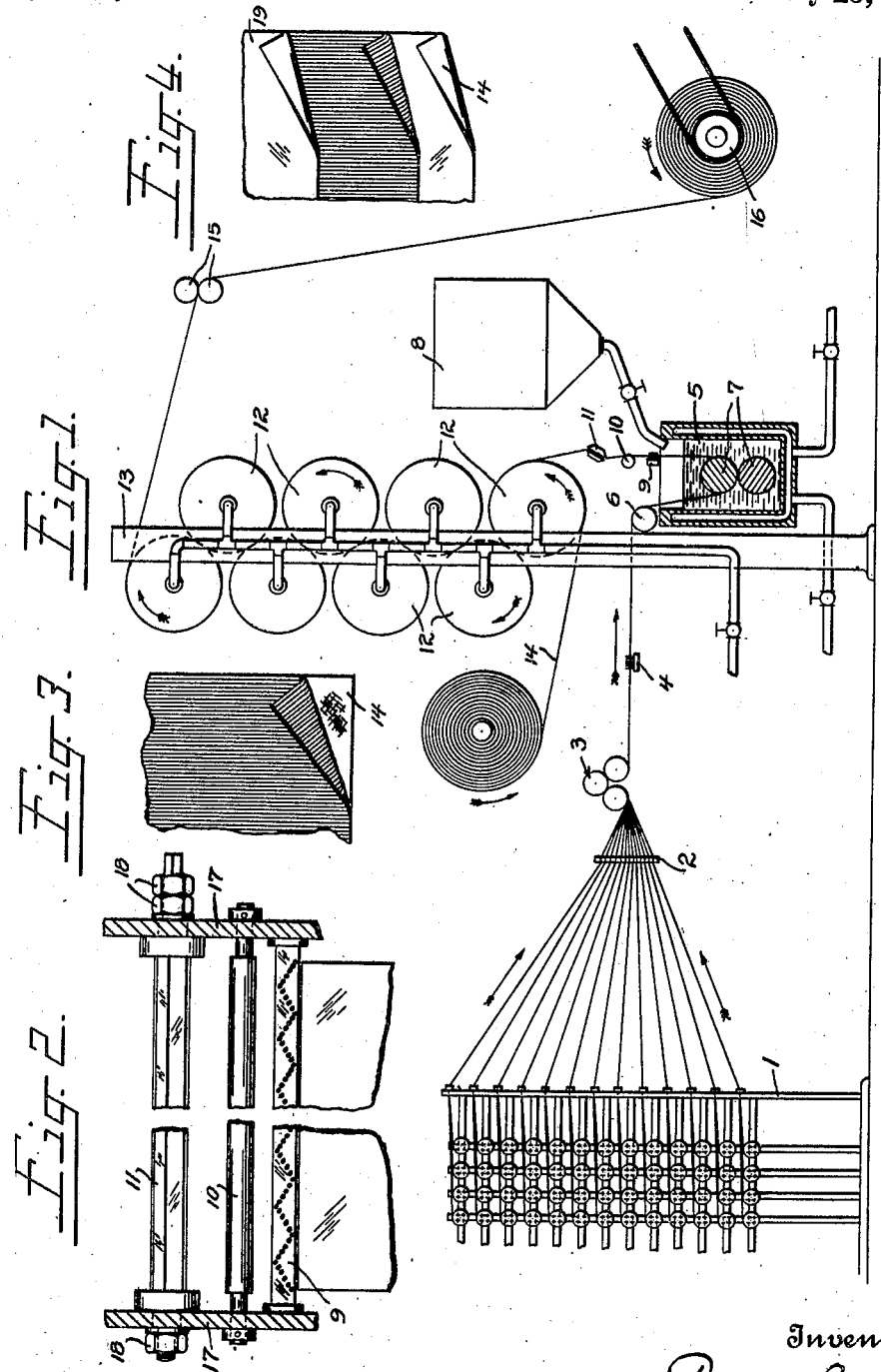
Inventor
Ernest Hopkinson

UNITED STATES PATENT OFFICE.

ERNEST HOPKINSON, OF NEW YORK, N. Y.

PROCESS FOR THE PRODUCTION OF FABRICATIONS OF RUBBER AND FILAMENTARY MATERIAL AND PRODUCTS OBTAINED THEREFROM.

1,424,020.   Specification of Letters Patent.   Patented July 25, 1922.

Application filed April 22, 1921. Serial No. 463,694.

*To all whom it may concern:*

Be it known that I, ERNEST HOPKINSON, a citizen of the United States, residing in New York, county and State of New York, have invented certain new and useful Improvements in Processes for the Production of Fabrications of Rubber and Filamentary Material and Products Obtained Therefrom, of which the following is a full, clear, and exact description.

This invention relates to processes for the production of fabrications of rubber and filamentary material, particularly the production of sheets of such material for use in the manufacture of cord tires, hose and other articles; and to the products obtained therefrom.

In the production of sheets of material for use in cord tires etc. as heretofore practiced, a fabric consisting of cords joined together by fine filling-threads has been employed. Rubber which has been broken down by milling is applied in immediate contact to this material for the production of a rubber coated cord fabric. It has been found in the production and use of sheets of material as described that although the bond between rubber and fibre is strong and better able to resist the flexing, abrasion etc. which occurs in the use of a tire made for example from rubber-coated square-woven fabric, there is still a tendency to separation of the fibre from the rubber which is due at least in part to the presence of filling threads and to the use of broken-down rubber in contact with the textile material. Processes have been proposed eliminating filling cords but disadvantages due to the use of broken-down rubber are still present in such products.

The principal objects of the present invention accordingly are to provide a simple economical process for producing sheets of rubber and filamentary substances such as cords which while possessing the advantages of sheets of rubberized cords as heretofore made shall be free from the disadvantages due to the use of filling threads and the use of broken-down rubber. Another object is to provide a product having improved resistance to wear, ageing, etc. Another object is to provide a product of the kind described which although employing fibrous material of lower cost than those ordinarily used shall have an increased endurance.

The invention consists of a process for producing fabrications of rubber and filamentary material which comprises coating warplike elements with rubber latex, maintaining the warplike elements in unwoven relationship and forming an unwoven sheet in which the warplike elements are joined together by rubber deposited from latex.

In order to illustrate more clearly the process and product constituting the invention there is shown in the accompanying drawing a diagrammatic apparatus by means of which the process may be carried out and also portions of the product in two stages of manufacture. In this drawing Fig. 1 represents a diagrammatic elevation showing cords passing from a creel through latex on to drying-cans and thence to a winding roll;

Fig. 2 is a detailed view of a portion of the apparatus dealing with the cords as they emerge from the latex tank;

Fig. 3 is a portion of the product showing the cords with dried rubber from latex associated with a liner strip; and Fig. 4 shows a portion of the product in another stage, namely, that in which a skim coat of rubber has been applied to the product shown in Fig. 3.

Referring now more particularly to these drawings, cord or other filamentary material wound on spools representing warp-like elements as shown in Fig. 1 of the drawing is arranged to be delivered from a creel 1. The individual cords are threaded through eyes on the creel and eyes on a thread-board 2 from which they pass through power-driven tension rolls 3 and an expansion-comb 4 on their way to a tank 5 for holding rubber latex or similar material. The devices which act upon the cords prior to their entry into the latex in the tank 5 serve preferably to arrange the cords so that each one is parallel and touches cords on either side thereof.

The cords pass from the expansion comb 4 over an idler 6 mounted as here shown immediately above the entrance side of the tank 5. The tank is preferably provided with a jacket for the introduction of steam or cold water if desired for regulating the temperature of materials therein. Mounted adjacent the bottom of the tank is a pair of squeeze-rolls 7. Although squeeze rolls are here shown it will be understood that a single roll may be employed if desired. A latex tank 8 is arranged to deliver latex into the tank 5. Mounted upon the tank 5 is an expansion-comb 9 above which is an idler 10 and in line with the comb and idler is a double doctor blade 11 adapted to scrape excess latex from the cords emerging from the tank. A series of dry-cans 12 are here shown mounted above the tank and adapted to receive cords emerging therefrom. The dry-cans supported by standards 13 are internally heated preferably by steam supplied through their axes. The cords meet, as they pass from tank 5 to the first of the series of dry-cans, a thin liner sheet 14 of sateen or the like which serves as a carrier or conveyor. This carrier-sheet prevents sticking of the cords to the dry-cans while in wet or moist condition. The material passing from the dry-cans is conducted through idlers 15 and thence to a wind-up roll 16 which may be driven by an outside source of power.

As shown more clearly in Fig. 2 the assembly of expansion-comb 9, idler 10 and doctor blades 11 are supported by uprights 17 and the doctor blades are angularly adjustable, to provide a greater or less scraping action, so that they may be inclined more or less to the vertical. This adjustment is provided by lock-nuts 18 provided on the extremity of the blades 11. By loosening these lock-nuts, adjustment may be secured in the usual manner.

In carrying out the process constituting the invention employing the apparatus above described, a series of cords or other filamentary material is led from spools through the creel-eyes 1, the thread-broad-eyes 2, the expansion comb, and over the idler above the latex tank 5. The cords arranged preferably in parallel relationship and with each cord touching its adjacent cord are passed through latex contained in the tank 5. The latex employed for coating the cords is preferably of the type treated with ammonia for preservation, and of an undiluted consistency containing say 25–40% rubber. It will be understood however that the rubber content may be greater than 40% where an artificially concentrated latex is employed. In general it has been found that a more continuous distribution of rubber on the fibre is obtained the higher the rubber-content of the latex employed.

When squeeze-rolls 7 are employed the cords pass therethrough and are compressed whereby any air that may be entrapped in the cords is expelled and the latex allowed to penetrate into those portions of the fibre formerly occupied by the air. As stated above of course squeeze-rolls may be dispensed with and a single roll employed if desired. It will be understood that if desired the cord elements may be treated with latex, dried and wound up on a spool. If desired the treatment may be conducted in vacuum in a chamber, treatment with later being carried out while the cord is evacuated. It has been found that after such treatment and winding on spools the individual cords are sufficiently adhesive so that when laid side by side in contact with one another and heated if desired may be made to adhere and form a satisfactory sheet, similar to that formed by passing over the dry-cans with the liner sheet and on to the wind-up roll as hereinafter set forth. On the other hand if desired the spools containing the latex treated cords may be mounted on the creel 1 and passed through the creel-eyes, thread-board-eyes, tension rolls, expansion comb, and into latex in the tank 5 to receive a second coating of rubber whereby the steps hereinafter indicated including drying on the dry-cans and rolling on the winding-up roll may be followed out.

The cords so-treated with latex pass through the tank 5 and through expansion-comb 9 which insures that the relationship which the cord had upon entering the tank is maintained. Passing on to the idler roll 10 the cords then proceed through the blades 11 which are inclined so that, as shown in the drawing, the cords touch the lower edge of the lower blade and the upper edge of the upper blade and any excess of latex is scraped off, the excess falling back into tank 5.

The cords passing from the blades 11 are met as they reach the first dry-can of the series 12 by a liner-cloth which is made of fine sheeting or sateen. This material passes between the cords and the surface of the first dry-can of the series. The liner 14 serves as a carrier for the cords and passes with the cords lying thereon throughout the series of dry-cans. During this passage the latex is entirely coagulated and dried. About 5–9 lbs. per square inch of steam are maintained in the cans though higher or lower pressures may be employed if desired. It will be understood however that by suitably regulating the speed of the dry-cans or their heat or the humidity and temperature of the atmosphere thereabout that the characteristics of the resulting rubber coated cords may be controlled as desired. The regulation and/or the humidity of the atmosphere about the cans may be controlled by a current of air flowing therepast heated and humidified in any desired manner.

The liner 14 with the dried rubber-coated cords passes from the last dry-can of the series over the idlers 15 and thence to the wind-up roll 16 where the supporting liner and the cords are wound up together and retained for subsequent skim-coating or other treatment as desired. The skim-coating preferably contains the vulcanizing agent employed. Various vulcanizing agents may be used such as sulphur or sulphur compounds ship and forming an unwoven sheet of parallel cords joined together by rubber.

4. A process of the kind described which comprises coating a series of parallel cords with rubber latex, driving off moisture from the latex while maintaining the cords in parallel relationship and forming an unwoven sheet of parallel cords joined together by rubber.

5. A process of the kind described which comprises immersing cords in rubber latex, and coating the cords therewith, maintaining the coated cords in parallel relationship and passing the cords so treated over a drying medium, driving off the moisture from the coated cords and forming an unwoven sheet of parallel cords joined together by rubber.

6. A process of the kind described which comprises coating warplike elements with rubber latex, drying the so treated warplike elements, applying a second treatment of latex to the dried rubberized elements, again drying the latex and forming an unwoven sheet in which the elements are joined together by rubber.

7. A process of the kind described which comprises coating a series of continuous cords arranged as warplike elements, passing the series of cords through a latex bath, passing the coated cords on to a drying surface driving off the moisture from the latex while maintaining the cords in parallel relationship, and forming a continuous sheet of parallel cords joined together by rubber.

8. A process for making sheets of rubberized cords which comprises applying latex to warplike elements, supporting the warplike elements on a carrier member, drying the latex-treated warplike elements while in contact with such member and forming an unwoven sheet in which the cords are joined together by rubber deposited from latex.

9. A process for making sheets of rubberized cords which comprises applying latex to a series of cords, supporting the cords on a carrier member, drying the latex-treated cords while in contact with such member, and forming an unwoven sheet on such carrier in which the cords are joined together by rubber deposited from latex.

10. A process for making sheets of rubberized cords which comprises applying latex to a series of parallel cords each cord touching its adjacent cord, supporting the cord on a liner serving as a carrier member, drying the latex-treated cords while in contact with such member, and forming thereby an unwoven sheet in which the cords are joined together by rubber deposited from latex.

11. A fabrication of rubberized cords which comprises an unwoven warp-like element and dried rubber applied thereto as latex.

12. A fabrication of rubberized cords which comprises a sheet formed of unwoven cords treated with latex and dried.

13. A fabrication of rubberized cords which comprises a sheet formed of parallel adjacent unwoven cords lying in contact with one another, treated with latex, and dried.

14. A fabrication of rubberized cords which comprises a warp and dried rubber applied thereto as latex and attached to a liner sheet.

15. A fabrication of rubberized cords which comprises a sheet formed of cords treated with latex, dried, and attached to a liner sheet.

16. A fabrication of rubberized cords which comprises a sheet formed of parallel adjacent cords lying in contact with one another, treated with latex, dried, and attached to a liner sheet.

17. A fabrication of rubberized cords which comprises a sheet formed of cords treated with latex, dried, and provided with a skim-coating of rubber.

Signed at New York, New York, this 15th day of April, 1921.

ERNEST HOPKINSON.

and nitro compounds. If desired, the vulcanizing ingredients may be placed in the latex bath and be combined with the rubberized cord or warp elements at that point in the process.

The product wound up on the roll 16 is shown more clearly in Fig. 3 where the liner 14 is shown covered with the rubber-coated cords. In Fig. 4 the product shown in Fig. 3 has been further treated by the application of a skim-coat 19.

The process described requires comparatively little attention and consequently the employment only of unskilled operators. The apparatus needed is simple. It has been found that one passage of cords through a bath of latex at ordinary temperatures causes an absorption by such cords of 20-25% of dry rubber based on the cord weight. Cords similarly immersed in the rubber cement adapted for coating cord-fabric results in the absorption of approximately 8% of dry rubber based on the weight of the cords from such cement. A second passage through latex of cords which have absorbed 20-25% of rubber from latex causes a total absorption of approximately 30% of dry rubber based on the weight of the cords taken. The increased absorption of rubber from latex when compared with cement is perhaps due to the difference in the character of the solid constituents of latex and the rubber of the cement, but the absorption is aided also by the fact that the solid particles of the latex are generally smaller than those of rubber cement and their penetration is therefore better.

Microscopic tests on fibres subjected to latex-treatment in this manner show a number of fibres in which the rubber has penetrated the lumen of the fibre. Microscopic examination of the treated fibres shows also that ammonia-treated latex gives a continuous coating on a surface of the fibres where cement does not provide such coating. It is pointed out further that the use of latex permits the employment of cheaper cotton where this material is employed as in cord tires. Cotton having a staple length of 1" and of a coarser construction than $23_s$ has been satisfactorily used to provide a rubberized cord-fabric of substantially equal endurance to the fabrics employing for example $1\frac{1}{8}$-$1\frac{1}{4}$" staple and of a fineness of $23_s$-$26_s$. Further of course there is a saving due to the absence of weaving.

The product resulting from this process possesses characteristics which present exceptional resistance to separation of the rubber and cord thus providing a longer life for tires, belting and other articles manufactured therefrom. These characteristics are due in part to the ability of the rubber to stretch uniformly so that for example in a tire the strain from bead to bead is more evenly distributed. The rubberized cords have greater endurance when prepared from latex. Increased penetration of the fibres by latex partially accounts for this increased endurance. It is also due to the fact that the rubber from latex in contact with the cords has not been broken down whereas in preparing cord fabric by the usual methods the rubber is broken down before application.

In addition the latex-treated cords possess an advantage over cement-treated cords in that all of the natural constituents of the rubber are applied to the cords, whereas in cements many of the natural constituents have been lost in the process of manufacture of crude rubber. Further by virtue of the presence of all the natural constituents it appears that the rubber may be vulcanized more rapidly than rubber applied by cements. It is further pointed out that the use of latex for coating cords and similar materials as compared with coating by cements, that is solutions of rubber and volatile organic solvents, possesses the advantage that in the case of latex the drying process causes the evaporation of water as compared with the evaporation of naphtha or other solvent employed for making rubber cement. The loss of such solvent entails an increased expense as compared with the loss of water from latex and a similar increase in expense occurs if solvent recovery apparatus is installed.

It will be seen that among others the objects of the invention set forth are achieved.

As many apparently widely different embodiments of the invention may be made without departing from the spirit thereof, it will be understood that I do not intend to limit myself to the specific embodiment herein set forth except as indicated in the appended claims.

Having thus described our invention, what we claim and desire to protect by Letters Patent is:

1. A process of the kind described which comprises coating warplike elements with rubber latex, maintaining the warplike elements in unwoven relationship and forming an unwoven sheet in which the warplike elements are joined together by rubber deposited from latex.

2. A process of the kind described which comprises coating cords with rubber latex, maintaining the cords in unwoven relationship and forming an unwoven sheet in which the cords are joined together by rubber deposited from latex.

3. A process of the kind described which comprises coating cords with rubber latex, driving off the moisture from the latex while maintaining the cords in parallel relation-